UNITED STATES PATENT OFFICE.

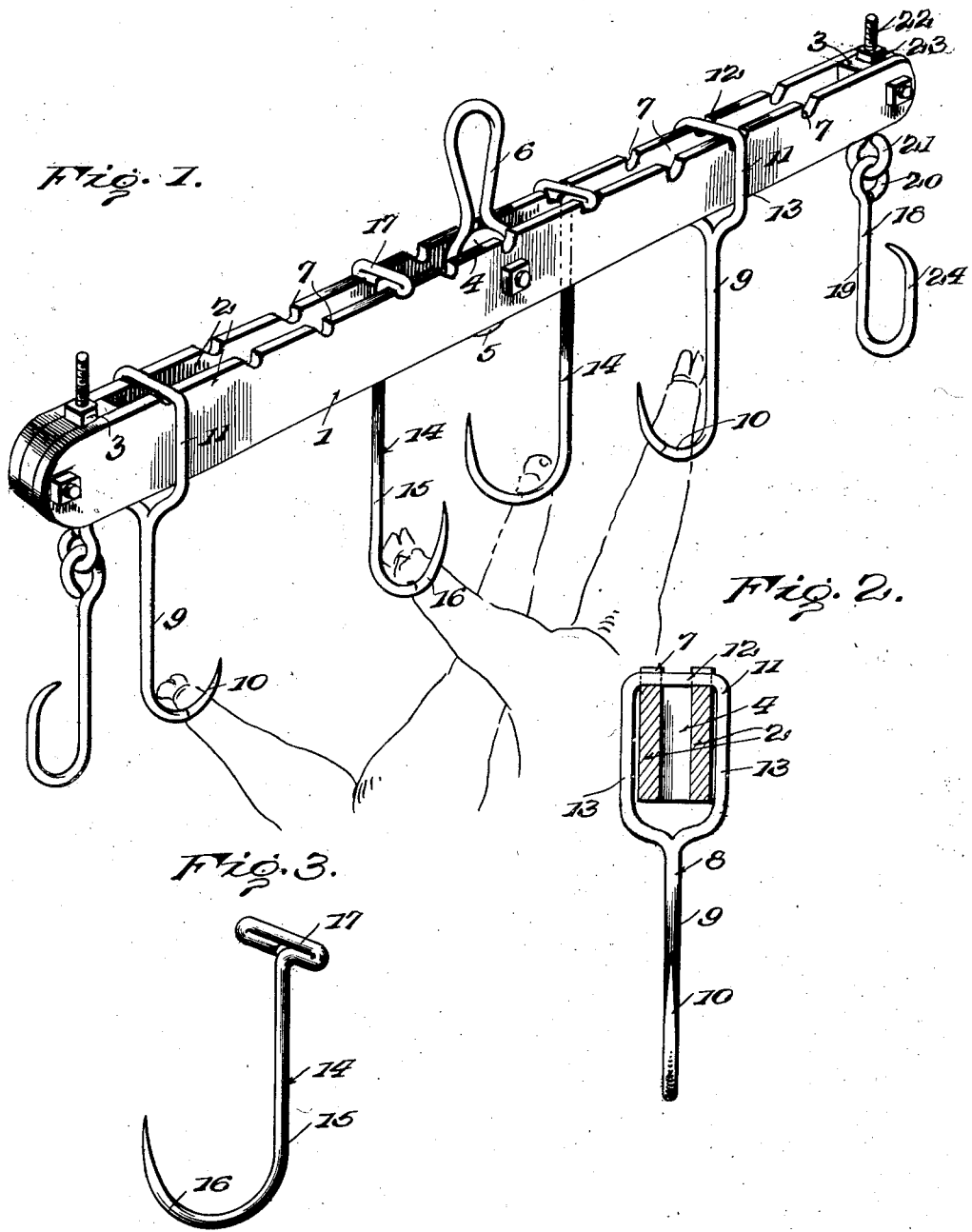

HERMEN E. ALBRECHT, OF WHAT CHEER, IOWA.

GAMBREL.

1,350,632.  Specification of Letters Patent.  Patented Aug. 24, 1920.

Application filed July 2, 1919. Serial No. 308,067.

*To all whom it may concern:*

Be it known that I, HERMEN E. ALBRECHT, a citizen of the United States, residing at What Cheer, in the county of Keokuk and State of Iowa, have invented certain new and useful Improvements in Gambrels, of which the following is a specification.

This invention relates to gambrels and has as its object to provide a gambrel which will possess advantages over ordinary gambrels now in use inasmuch as by the use of the gambrel embodying the present invention, two carcasses may be suspended therefrom simultaneously and thus the task of halving and quartering the carcasses may be greatly facilitated, whereas with the ordinary gambrel but a single carcass may be hung at a time.

Another object of the invention is to so construct the gambrel bar and the hooks associated therewith that the hooks may be adjusted so as to suitably spread the sides of the carcass, two of the hooks being permanently carried by the bar and two others of the hooks being removably mounted upon the bar so that when it is desired to prepare but a single carcass at a time, the two hooks last mentioned may be removed and will therefore not interfere with adjustment of the first mentioned hooks, nor be in the way of the carcass.

In the accompanying drawings:

Figure 1 is a perspective view of the gambrel embodying the present invention and illustrating the manner in which two carcasses may be suspended from the gambrel;

Fig. 2 is a vertical transverse sectional view through the gambrel bar, one of the hooks permanently associated with the bar being shown in elevation suspended therefrom;

Fig. 3 is a perspective view of one of the removable hooks.

The gambrel bar is indicated in general by the numeral 1 and comprises two bar members indicated by the numeral 2 and formed of wood, metal, or any other suitable material. These bar members are held spaced by means of end and intermediate spacing blocks indicated respectively by the numerals 3 and 4, the block 3 being disposed between the said members 2 at their opposite ends and the block 4 being disposed between the said members at a point midway between their ends. The suspension device for the gambrel bar may be formed of wire bent to provide a loop 5 surrounding the block 4, and a suspension loop 6, which latter extends above the gambrel bar and may be engaged with any suitably located supporting hook (not shown). The bar members 2 are formed in their upper edges with oppositely located notches 7, the notches being arranged in two series at the opposite sides of the mid portion of the bar and having vertically disposed walls which are presented in the direction of the respective end of the bar.

As before stated, two of the gambrel hooks are to be permanently associated with the gambrel bar and two others of the hooks are removably assembled with the bar. Each of the first mentioned hooks, indicated in general by the numeral 8 and clearly shown in Fig. 2 of the drawings, is preferably formed from rod material and comprises a shank 9 terminating at its lower end in a bill 10 and at its upper end in a loop 11 of dimensions to adapt it to extend about the bar but of a height greater than the thickness of the bar so as to adapt it to be slidably moved along the said bar. The upper or connecting portion of this loop, indicated by the numeral 12, is designed to be seated in the notches 7 interchangeably, the sides of the loop indicated by the numeral 13 extending at opposite sides of the said bar as clearly shown in the said Fig. 2 of the drawings. These particular hooks are arranged one at each side of the suspension member 6, as clearly shown in Fig. 1, and they may be engaged in any desired pairs of the notches 7 to suitably spread the sides of the carcass. Where a single carcass is to be halved at one time, these hooks will be engaged at the connecting portions 12 of their loops 11 in the notches 7 relatively near the mid portion of the bar and the hind legs of the carcass will then be engaged with the hooks in the usual manner, the carcass being thus suspended immediately below the mid portion of the bar so that the weight will be evenly distributed at opposite sides of the point of suspension of the said bar.

Fig 3 of the drawings clearly illustrates one of the removable hooks and this hook is indicated in general by the numeral 14 and comprises a shank 15 terminating at its lower end in a bill 16 and at its upper end in a cross bar or head 17 extending at right angles to the shank and in opposite directions therefrom. In engaging these hooks 14 with the gambrel bar, the hooks are turned to such position that their cross bars 17 will extend substantially parallel to the bar members 2 and the hooks may then be inserted upwardly between the bar members until the cross bar 17 is more elevated than the gambrel bar whereupon the hooks may be rotated through an arc of 90° so as to position the cross bars 17 transversely of the gambrel bar. The hooks may then be adjusted along the gambrel bar and their cross bars 17 seated in the proper ones of the notches 7. Where two carcasses are to be halved or otherwise acted upon simultaneously, the hooks 14 are assembled with the gambrel bar in the manner stated and in position located between the hooks 8, and after all of the hooks have been suitably adjusted one hind leg of one carcass is engaged over the bill of one of the hooks 8 and the other leg of the carcass is engaged over the bill of that one of the hooks 14 which is located at the opposite side of the suspension device 6, the hind legs of the other carcass being likewise engaged with the other hooks 8 and 14. In this manner the two carcasses will be properly suspended for halving and the weight will be evenly distributed with relation to the point of suspension of the gambrel bar.

If desired supplemental hooks, indicated in general by the numeral 18, may be provided at the ends of the gambrel bar, each of these hooks comprising a shank 19 provided at its upper end with an eye 20 pivotally engaged with the eye 21 of a bolt 22 fitted through the respective spacing member 3 and secured by a nut 23, the lower end of the shank 19 being provided with a bill 24.

Having thus described the invention, what is claimed as new is:

1. A gambrel comprising a bar, an anchored hook at each end of said bar, and hooks having eyes adjustable along the said bar and said end hooks forming a stop means for the eyes whereby the association between the adjustable hooks and the bar is permanently maintained.

2. A gambrel comprising a bar having spaced notches, an anchored hook at each end of said bar, and hooks having eyes adjustable along said bar to seat in said notches, said end hooks forming a stop means for the eyes whereby the association between the adjustable hooks and the bar is permanently maintained.

3. A gambrel comprising a bar, an anchored hook at each end of said bar, hooks having eyes adjustable along said bar and said end hooks forming a stop means for the eyes whereby the association between the adjustable hooks and the bar is permanently maintained, and removable hooks adapted to be spaced along said bar.

4. A gambrel comprising a bar having spaced notches, an anchored hook at each end of said bar, hooks having eyes adjustable along said bar to seat in said notches, said end hooks forming a stop means for the eyes whereby the association between the adjustable hooks and bar is permanently maintained, and removable adjustable hooks also for coöperation with the said bar for seating in the spaced notches therein.

5. A gambrel comprising a bar formed with spaced parallel members, an anchored hook at each end of said bar, hooks having eyes adjustable along the said bar and said end hooks forming a stop means for the eyes whereby the association between the adjustable hooks and the bar is permanently maintained, and additional hooks having T-shaped ends for passing between the bar members in one position and engaging therewith in another position.

6. A gambrel comprising a bar formed of notched spaced parallel members, an anchored hook at each end of the said bar, and hooks having eyes adjustable along said bar to seat in said notches, said end hooks forming a stop means for the eyes whereby the association between the adjustable hooks and the bar is permanently maintained, and adjustable hooks separable from the bar and having T-heads for engagement over said bar and with said notches when in one position and for removal when in another position.

In testimony whereof I affix my signature.

HERMEN E. ALBRECHT. [L. S.]